(12) United States Patent
Enos

(10) Patent No.: US 6,308,746 B1
(45) Date of Patent: Oct. 30, 2001

(54) MOTORCYCLE CUFF

(76) Inventor: Patrick F. Enos, 5319 University Dr., #216, Irvine, CA (US) 92612

( * ) Notice: Subject to any disclaimer, the term of this patent is extended or adjusted under 35 U.S.C. 154(b) by 0 days.

(21) Appl. No.: 09/772,089

(22) Filed: Jan. 24, 2001

(51) Int. Cl.$^7$ ........................................ B65B 1/04
(52) U.S. Cl. .................................. 141/1; 141/4; 141/97; 141/370; 141/311 A
(58) Field of Search .................. 141/4, 1, 86–88, 141/97, 115, 331, 339, 368, 369, 370, 311 A; 220/86.2

(56) References Cited

U.S. PATENT DOCUMENTS

| | | | | |
|---|---|---|---|---|
| 4,811,763 | * | 3/1989 | Kupske | 141/44 |
| 5,878,795 | * | 3/1999 | Armellino | 141/86 |
| 5,894,872 | * | 4/1999 | Gale | 141/368 |

* cited by examiner

*Primary Examiner*—Timothy L. Maust
(74) *Attorney, Agent, or Firm*—Jeffrey K. Seto

(57) ABSTRACT

A device that is placed over an inlet of a motorcycle gas tank that prevents the overflow of gasoline during the filling of the motorcycle gas tank. The device comprises an upper portion that accepts a gas pump nozzle, an inner core that captures gasoline fumes and provides for pressure build up inside the gas tank, and a lower portion that is designed to mesh with the motorcycle gas tank opening. The upper portion and inner core are basically the same on each model of the device, or motorcycle cuff. The lower portion of the motorcycle cuff is specifically designed to adapt to different types of motorcycle gas tanks, such as flush mounted and indented gas tank openings. The motorcycle cuff gives motorcycle riders the same gas filling advantages of filling their tanks to a desired full level, as those enjoyed by car drivers, by working in conjunction with the automatic shut-off feature available in most gasoline pumps.

14 Claims, 3 Drawing Sheets

MOTORCYCLE CUFF

BACKGROUND OF THE INVENTION

The present invention relates generally to the field of motorcycle accessories, and more specifically to an apparatus that prevents overflow during the filling of a motorcycle gas tank.

Motorcycles have many uses in today's society. They are used as economical commuting vehicles, as racing and recreational vehicles and can even be found in the military. Motorcycles typically are lighter than traditional cars, have smaller engines and get much better gas mileage than cars.

Motorcycles generally are two-wheeled vehicles resembling a heavy bicycle that is powered by a gasoline engine mounted between the wheels. Motorcycles have three to five speed gearshifts, and usually have a chain or belt drive between the motor and the rear wheel. The engine is either a two-stroke or a four-stroke gasoline engine with between one and six cylinders. The engines can be started by a foot-activated starter crank, but many motorcycles now have electric starters. Motorcycles have a rear-wheel brake operated by a foot pedal and a front-wheel brake operated by a hand lever. Some motorcycles use drum brakes, but today's modem motorcycles tend to use disk brakes, especially for the front-wheel brake. The engine of a motorcycle is usually air-cooled, but some engines, especially those of large or racing motorcycles, are water-cooled.

An operator's license is required to operate a motorcycle, with provisions and requirements different from those for driving an automobile. Many motorcycles accommodate a passenger in addition to the driver, and attachable sidecars supported by one wheel are sometimes used. Three-wheeled motorcycles, which have two wheels in the rear, are also used occasionally. Vehicles similar to the motorcycle include the motor scooter, which is less powerful and has a foot platform between the front post and the seat, and the moped, essentially a bicycle with a built-in motor that can be started by pedaling.

Motorcycles are popular because of their compact size, easy maneuverability, ability to accelerate quickly, and economy. Motorcycles are loved by many enthusiasts who find freedom and exhilaration when cruising on the two wheeled vehicles. Motorcycles are widely used for recreation, transportation, and racing. Also, they are widely used by police and military forces around the world. In the United States, more than 1,000 motorcycle clubs exist, with the American Motorcycle Association as a governing body. Motorcycle racing developed as a sport in the early 20th century and today features both endurance and speed events.

Since most motorcycles have internal combustion engines, they also have a gasoline tank that must periodically be refilled. Gasoline is a mixture of the lighter liquid hydrocarbons used chiefly as a fuel for internal-combustion engines. It is produced by the fractional distillation of petroleum; by condensation or adsorption from natural gas; by thermal or catalytic decomposition of petroleum or its fractions; by the hydrogenation of producer gas or coal; or by the polymerization of hydrocarbons of lower molecular weight. Gasoline has many unfavorable characteristics that necessitates care when handling the flammable liquid. Thus, when refilling a motorcycle gas tank it is important not to let the gas tank overflow. Gasoline will be absorbed by clothing and other cloth like material, rendering the material flammable. For the careless driver that forgets about gas soaked clothing this could spell disaster at a later time, such as when the person is standing around a campfire or lighting a cigarette. Gasoline also has caustic characteristics. If it is splashed on the outside of a motorcycle's gas tank it will eventually cause fading of the paint and finish of the gas tank. Gasoline also has a caustic effect on skin. An overflow during filling could cause gas to be splashed on the hands or other parts of the person doing the filling. If the affected area of skin is not washed immediately the person will experience a burning sensation. Further, unwashed hands and fingers with gasoline residue on them could cause burning and irritation of the eyes if the person later uses his fingers to rub his eyes or eyelids. Finally, not to be forgotten is the unpleasant odor of gasoline. Spilling and overflow of gasoline on any item will leave the item with a smell of gasoline that is harmful to the person and the environment.

In an attempt to capture and otherwise limit the fumes and smell that are emitted during the filling of gas tanks, gas pump manufacturers have instituted the use of a corrugated rubber nozzle that surrounds the gasoline dispensing nozzle. This rubber nozzle is intended to fit around the outside of a gas tank inlet while the metal nozzle is inserted down and into the gas tank inlet. During filling of the tank, any fumes that try to escape from the gas tank are prevented by a seal the rubber nozzle forms around the outside of the gas tank inlet. Many gas pumps will not even allow the flow of gasoline to begin until the rubber hose is pushed back a sufficient distance from the tip of the metal nozzle. Almost all gas pump systems also have an auto shut-off feature whereby the gas pump detects when the gas tank is full based on pressure that is felt by the gas coming out of the gasoline dispensing nozzle. Such an automatic shut-off feature works well with automobile gas tanks where the gasoline must travel some distance down a fill tube before it ultimately reaches the gas tank. The fill tube acts as a safety overflow device allowing the gas pump time to realize the gas tank is full and automatically stop before an overflow occurs. Motorcycles do not have a tube leading to the gas tank. Rather, the gasoline dispensing nozzle is inserted directly into the gas tank itself. Therefore, no extra time is provided between the filling of the gas tank and the initiation of the automatic shut-off feature, leading to unwanted overflows. One can understand how this happens by imagining a situation where a person filling a cars gas tank wishes to "top off" the gas tank; fill the car's tank so that the gasoline level can be seen at the tank inlet. In such a situation, the person doing the filling lets the automatic shut-off feature stop the filling of the gas tank at its regular time. However, since the person wishes to fill not only the gas tank but the fill tube also, he starts filling the tank again. When the auto shut-off feature stopped the gas flow the first time, there was no overflow. However, on the second occurrence of the auto shut-off feature, gasoline overflows from the gas tank. This is because the fill tube was already partially filled during the first filling and during the second subsequent filling there is not enough empty space in the fill tube to hold all of the gasoline that continues to be dispensed even though the auto shut-off feature has been initiated. Such is the situation with motorcycle gas tanks. Many times motorcycle drivers will hold the rubber nozzle up and out of the way so that they can see the level of gas in the gas tank as it start to rise. This method allows the rider to stop filling before an overflow occurs, however, it also requires the motorcycle rider to soil his fingers with soot and gas residue from the rubber hose.

It is therefore an object of the present invention to prevent unwanted overflows when filling the gas tank of a motorcycle. It is also an object to provide a device that allows motorcycle drivers to fill their gas tanks without getting their fingers dirty from the rubber fume catching tubes and gasoline residue. It is further an object to let motorcycle riders take advantage of the auto shut-off feature of gasoline pumps, wherein the auto shut-off feature stops the flow of gasoline before any overflow of gasoline occurs.

SUMMARY OF THE INVENTION

The present invention provides a device that is used during the filling of a motorcycle gas tank that prevents gasoline from overflowing the gas tank and allows the user to fill his gas tank without getting his hands soiled. The device has upper portion, an inner core that runs the length of the device and a lower portion that temporarily attaches to the gas tank opening. The inner core can have flexible membranes that prevent gas fumes from escaping out of the gas tank and into the atmosphere. The lower portion is specifically designed to the type of gas tank on the motorcycle, such as flush mounted or indented gas tank inlets.

BRIEF DESCRIPTION OF THE DRAWINGS

The invention of the present application will now be described in more detail with reference to the accompanying drawings, given only by way of example, in which.

DETAILED DESCRIPTION OF THE INVENTION

Figure 1A:
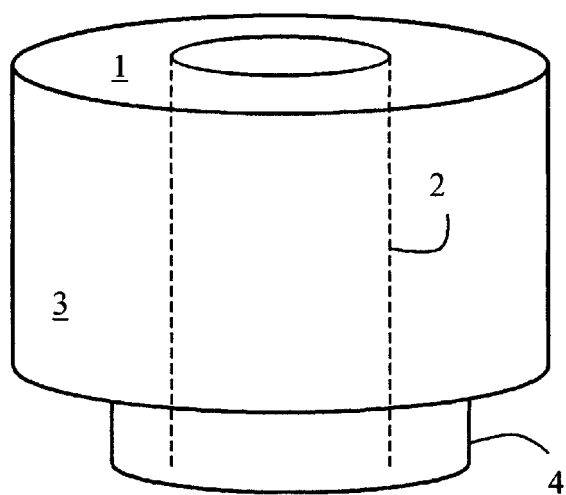
FIG. 1(a) is a diagram of a preferred embodiment.

Referring to FIG. 1(a), the present motorcycle cuff has upper portion 1, inner core 2, outer wall 3, and lower portion 4. In operation, the motorcycle cuff is placed on top of a motorcycle gas tank opening or directly on the nozzle of a gas pump prior to filling of the gas tank. The user pushes, or twists, the device down on to the gas tank opening so that lower portion 4 surrounds the circumference of the gas tank inlet and frictionally engages the gas tank inlet. Lower portion 4 can optionally be provided with small studs, similar to those on the gas cap, in order to facilitate a secure attachment. If studs are used on lower portion 4 then a slight twist of the device would lock it into place, as well as unlock the device. In another method of use the cuff is first placed n the metal nozzle of a standard gas pump and the lower portion of the cuff is mated with the gas tank opening when the tip of the nozzle is placed into the gas tank. This method allows easy visual inspection of the distance the nozzle protrudes out of the cuff. The embodiment shown in FIG. 1 assumes that the gas pump is one in which a metal nozzle is surrounded by a corrugated rubber hose. Such rubber hoses are commonly seen on gas pumps and are provided so as to prevent gas fumes from escaping during filling. The metal nozzle of the gas pump is inserted into inner core 2 and the rubber hose hits upper portion 1 and is prevented from entering the inner core 2. For gas pumps that do not activate until the rubber hose is pushed back a specific distance, upper portion 1 provides such pushing. The user then begins filling the gas tank in the usual manner. The present device provides the user with the freedom of not having to watch the level of gas rise as it fills his tank. Instead, the user can lock the gas pump in the open position, if such a lock is provided, so that gas flows without the user squeezing the gas pump handle. The user may then forget about the rest of the filling procedure, similar to the procedure used when filling a car's gas tank. While it is recommended that the user not leave the their motorcycle unattended while it is being filled, the present cuff relieves the user of having to peak inside the tank or guess when to stop filling. The present device provides a sufficient build up of pressure inside the motorcycle gas tank so as to engage the automatic shut-off feature that is common in most gas pumps. When the tip of the metal nozzle is approximately ½ inch inside the motorcycle's gas tank, the gas pump will shut off automatically when the gas tank is full.

Figure 1B:
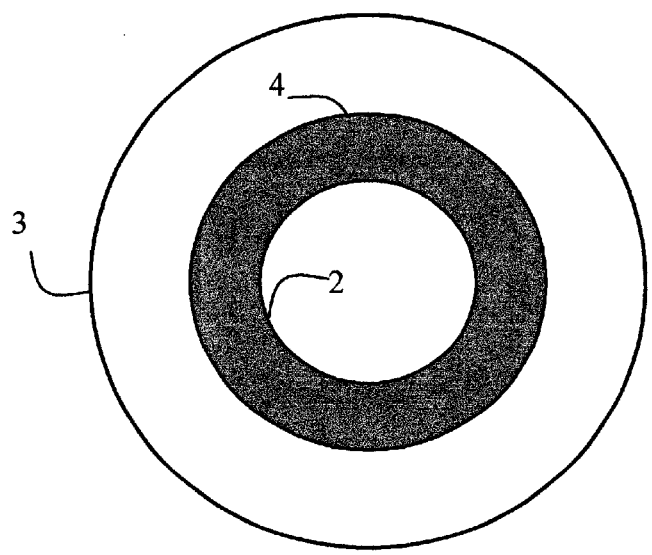
FIG. 1(b) is a bottom view of the preferred embodiment.

FIG. 1(b) is a bottom view of the preferred embodiment of the motorcycle cuff. Outer wall 3 defines the basic shape of the cuff and lower portion 4 surrounds inner core 2. Lower portion 4 is preferably made of a semi-hard rubber that maintains its shape but allows some flexibility. The inner circumference of lower portion 4 is slightly smaller than the outer circumference of a standard motorcycle gas tank inlet, so that a snug frictional attachment occurs when the cuff is pushed or twisted onto the gas tank inlet. In operation, the gas pump's metal nozzle is inserted through inner core 2 so that it protrudes approximately ½ inch into the gas tank.

Figure 2:
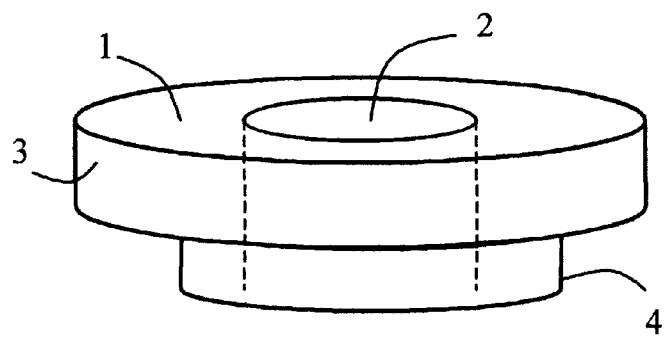
FIG. 2 is diagram of an alternative embodiment.

FIG. 2 is a diagram of an alternative embodiment of the present invention. The embodiment of FIG. 2 is designed to be used with gas pumps that do not have a corrugated rubber hose that surrounds the metal nozzle. This embodiment still has upper portion 1, inner core 2, outer wall 3 and lower portion 4. In this embodiment, the main difference is the overall height of the device. Outer wall 3 is now substantially shorter than in the embodiment of FIG. 1(a). It logically follows that inner core 2 is also shorter. The device can be made shorter for gas pumps that do not have a rubber hose surrounding the metal nozzle because there is no longer a need to "push" the rubber hose back a specified distance before the flow of gas can begin. The gas pump that this embodiment is used with has no rubber hose. So the user need only insert the metal nozzle through inner core 2 so that it protrudes approximately ½ inch past the device and into the gas tank, and then squeeze the gas pump handle to initiate the flow of gasoline. Thin flaps, or membranes, in core 2 prevent gasoline from splashing back up through the device and also provide sufficient pressure build up to trigger the auto shut-off feature of the gas pump when the tank is full.

Figure 3:
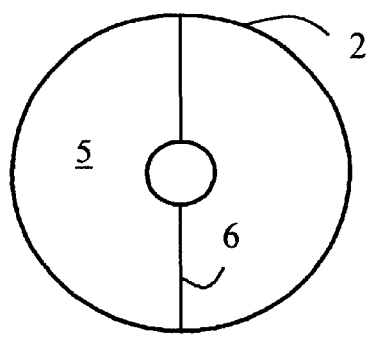
FIG. 3 is a view of the inner core.

FIG. 3 is a detailed view of inner core 2. Membrane 5 extends across the interior of core 2 and is substantially cut in half by slit 6. A circular opening can optionally be left in the middle of membrane 5, as is shown in FIG. 3, so as to conform to the metal nozzle that is inserted therethrough. Preferably, more than one membrane is used in core 2 with each membrane being spaced some distance apart. Also, it is preferred that the slits of different membranes run perpendicular to one another so as to optimally prevent gas from splashing out of the gas tank and allow the required build up of pressure in the gas tank that will trigger the automatic shut-off of gas flow when the gas tank is full. In an alternative embodiment, two slits are made across the length of membrane 5 so that the membrane is divided into four equal parts. In both embodiments, membrane 5 can have a hole left in its center, or no hole can be left in the center. In a further embodiment, the membrane(s) that extend across the interior of inner core 2 can be manufactured so that the "halves" or "quarters" slightly overlap each other. Of course other membranes or flaps can be designed and used with the present invention with the only limitation being that they prevent splashing of gas back up through the inner core and that the required pressure to trigger the automatic shut-off of the pump be allowed to build up. For embodiments that do not include flexible membranes, the inner core is sufficiently small so as to form a loose seal with the metal nozzle.

Figure 4:
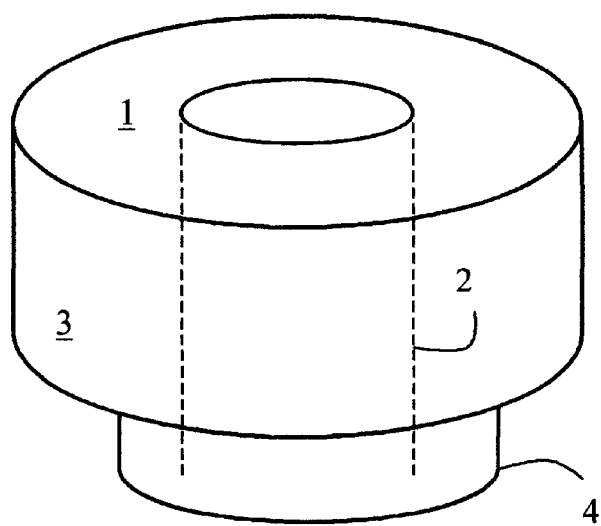
FIG. 4 is a diagram of another alternative embodiment.
Figure 5:
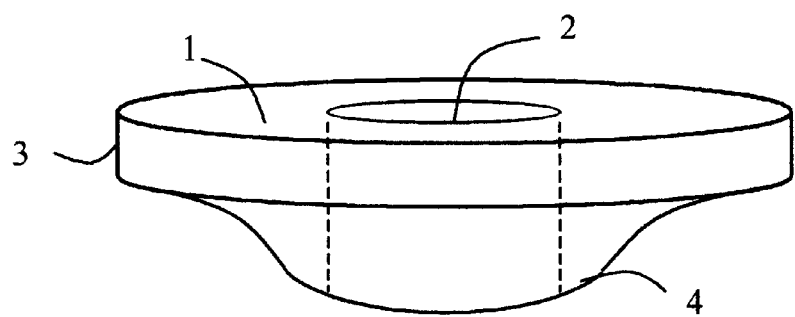
FIG. 5 is a diagram of another alternative embodiment.

FIGS. 4 and 5 show a motorcycle cuff that is designed to be used on motorcycles that have an indented gas tank opening, such as the popular Ninja motorcycle. Each cuff is designed to fill the space of the indentation that surrounds the gas tank inlet with the only difference, between the cuffs of FIGS. 4 and 5, being that the cuff of FIG. 4 is to be used with gas pumps that have a corrugated rubber hose around the metal nozzle and the cuff of FIG. 5 is designed to be used with gas pumps that do not have a rubber hose around the metal nozzle. As discussed above, the height of the cuff in FIG. 4, primarily outer wall 3 and inner core 2, allows the rubber hose to be pushed back a sufficient distance from the tip of the metal nozzle so that the gas pump allows gas to begin flowing. The cuff of FIG. 5 can be made shorter because with the pump that it is designed for there is no rubber hose to push back. The metal nozzle is simply inserted through inner core 2, and subsequently the membrane(s) that are housed therein, until the nozzle extends approximately ½ inch into the gas tank. Then filling can begin in the standard manner.

With each embodiment disclosed above, after the pump has filled the gas tank and has shut off, the user pulls the nozzle back from the gas tank opening removes the cuff from the nozzle, if the cuff is attached to the nozzle, and replaces the pump from where he got it. If the motorcycle cuff is attached to the gas tank opening then the cuff is pulled and/or twisted off and put in its proper location. Since the present cuff can be inexpensively produced, via injection molding methods for instance, it is envisioned that motorcycle drivers may buy and keep a cuff somewhere on their own motorcycle. However, gas station managers may also want to maintain motorcycle cuffs at their gas stations so as to induce motorcycle riders to fill up at their gas stations.

The foregoing description of the specific embodiments will so fully reveal the general nature of the invention that others can, by applying current knowledge, readily modify and/or adapt for various applications such specific embodiments without departing from the generic concept. Therefore, such adaptations and modifications should and are intended to be comprehended within the meaning and range of equivalents of the disclosed embodiments. It is to be understood that the phraseology of terminology employed herein is for the purpose of description and not of limitation.

I claim:

1. An apparatus comprising a circular cuff that is temporarily placed on top of an opening of a motorcycle gas tank or over a metal nozzle of a standard gasoline pump, during a filling of the gas tank, after the nozzle is through the cuff the user can visually verify a distance the nozzle protrudes out of an opposite end of the cuff, the apparatus provides pressure against a corrugated rubber hose that surrounds the metal nozzle, the apparatus further prevents under-filling of the gas tank by averting an automatic shut-off feature of the gasoline pump until the gas tank is actually full, the circular cuff comprising:

a top portion that accepts the metal nozzle but blocks passage of the corrugated rubber hose;

an outer wall that provides structural support to the cuff, wherein a circumference of the outer wall is greater than a circumference of the rubber hose and of the opening to the gas tank;

an inner core that allows passage of the metal nozzle through the apparatus; and, a lower portion that forms a temporary seal with the opening of the gas tank; wherein, the circular cuff prevents gasoline fumes from escaping out of the gas tank and into the atmosphere, provides a sufficiently low build up of pressure inside the motorcycle gas tank so that the automatic shut-off feature of the gasoline pump is prevented from activating until the motorcycle gas tank is actually full, but also ensures the automatic shut-off feature is activated before gasoline overflows out of the motorcycle gas tank.

2. The apparatus of claim 1 wherein, the circular cuff is made of a semi-rigid rubber compound.

3. The apparatus of claim 1 wherein, outer wall is one to six inches high.

4. The apparatus of claim 1 wherein, the lower portion is adapted to fit flush mounted gas tank openings.

5. The apparatus of claim 1 wherein, the lower portion is adapted to fit recessed gas tank openings.

6. The apparatus of claim 1 wherein, the inner core has at least two flexible membranes that allow passage of the metal nozzle through the inner core and form a loose seal around the metal nozzle.

7. The apparatus of claim 1 wherein, the inner core has a general funnel shape and an area between the outer wall of the apparatus and the inner core is solid.

8. A method for preventing an automatic shut-off feature of a standard gasoline pump from activating prematurely that involves a circular cuff being used to provide additional pressure against a corrugated rubber hose that surrounds a metal nozzle of the gasoline pump, the method allows a tip of the metal nozzle to travel a shorter distance into a gas tank but ensures activation of the automatic shut-off feature of the gas pump before an overflow occurs, the method comprising the steps of:

placing the circular cuff over an opening to the gas tank or over the tip of the metal nozzle of the standard gasoline pump wherein, the circular cuff comprises:

an upper portion that accepts the metal nozzle and stops the corrugated rubber hose thereby providing additional pressure against the rubber hose when the tip of the nozzle is placed into the gas tank;

an inner core that forms a loose seal around the metal nozzle wherein the loose seal provides for exact placement of the tip of the metal nozzle a desired distance through the circular cuff; and, a lower portion that forms a temporary seal with the opening to the gas tank, prevents gas from splashing out of the gas tank, captures gasoline fumes and provides for pressure build up inside the gas tank; and, using the circular cuff/gas pump combination to fill the gas tank in the usual manner of squeezing a handle of the gasoline pump and letting the automatic shut-off feature stop a flow of gasoline from the pump to the gas tank.

9. The method of claim 8 wherein, the circular cuff is made of a semi-rigid rubber compound.

10. The method of claim 8 wherein, the outer wall is one to six inches high.

11. The method of claim 8 wherein, the lower portion is adapted to fit flush mounted gas tank openings.

12. The method of claim 8 wherein, the lower portion is adapted to fit recessed gas tank openings.

13. The method of claim 8 wherein, the inner core has at least two flexible membranes that facilitate passage of the metal nozzle through the inner core and help form the loose seal around the metal nozzle.

14. The method of claim 8 wherein, the inner core has a general funnel shape and an area between an outer wall of the apparatus and the inner core is solid.

\* \* \* \* \*